No. 844,287. PATENTED FEB. 12, 1907.
H. F. PROVANDIE.
DISH FOR HOLDING ORANGES, &c.
APPLICATION FILED FEB. 14, 1906.

WITNESSES.
Marion E. Brown
Sumner B. Robinson

INVENTOR.
HERBERT F. PROVANDIE
BY Albert W. Brown
ATTORNEY.

UNITED STATES PATENT OFFICE.

HERBERT F. PROVANDIE, OF MELROSE, MASSACHUSETTS.

DISH FOR HOLDING ORANGES, &c.

No. 844,287. Specification of Letters Patent. Patented Feb. 12, 1907.

Application filed February 14, 1906. Serial No. 301,069.

*To all whom it may concern:*

Be it known that I, HERBERT F. PROVANDIE, a citizen of the United States, residing at the town of Melrose, in the county of Middlesex and State of Masachusetts, have invented a new and useful Improved Dish for Holding Oranges, &c., of which the following is a specification.

The object of this invention is to provide a dish for table use to hold an orange, grapefruit or pomelo, or other such like fruit while being eaten.

The dish of this invention for the purpose stated is composed of a receptacle of suitable shape to inclose an orange, &c., and which is in two parts applied together, so as to be closed together and opened from each other and when closed so supported as to leave an open way or space between their then contiguous edges, in combination with supports for each of said parts when opened from each other and for the dish as one whole when its parts are closed, and with means in each part for holding an orange, &c., on its opposite sides, all substantially as hereinafter described.

In the accompanying drawings, forming a part of this specification, the improved tabledish of this invention is illustrated.

Figure 1:
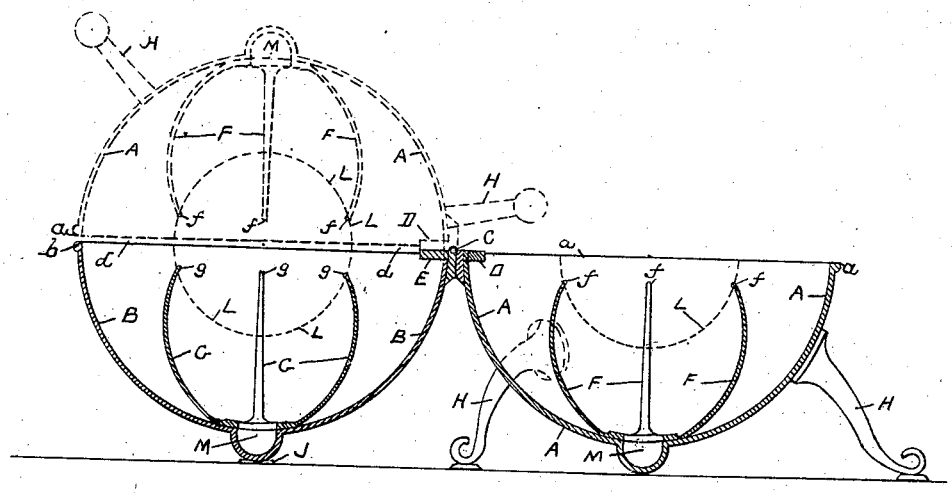
Figure 2:
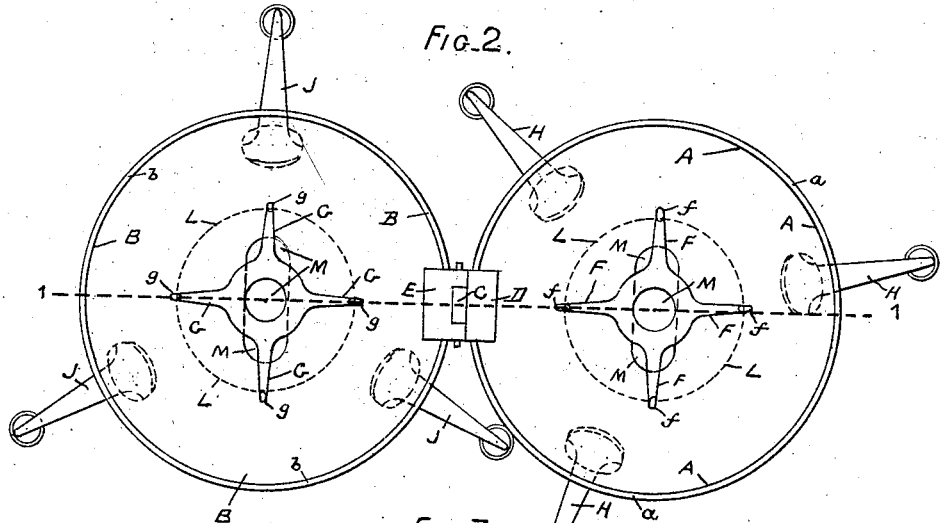
Figure 3:
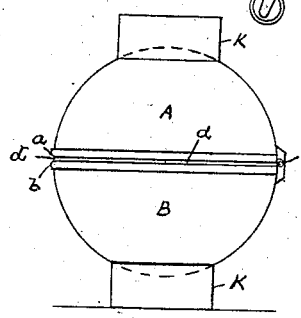

Figure 1 is a central vertical section on dotted line 1 1, Fig. 2, and showing the two parts of the dish as closed, the then upper part being shown in dotted lines and also as opened out from each other. Fig. 2 is a plan view of the dish with its two parts opened out from each other, as shown in Fig. 1. Fig. 3 is a side view of a modification as hereinafter appears.

In the drawings, A and B are the two parts or sections of the dish, each similarly semiglobular in shape and of the same size and both placed one over the other, forming a dish of hollow globular form. The two dish-sections A B at one and the same side are connected together by a pintle-hinge joint C, suitably attached, and each is provided at said hinge with a similar ledge extension D E, projecting inwardly to serve as a support for the top section A on the lower section B when the two sections are closed as to each other, and all in a manner to leave between the then adjacent or contiguous edges *a b* of the sections an open slit or way or space *d*, entirely across the receptacle, except as the portion of each section where the said ledges are located. This open way *d* is for passing a suitable knife or cutting blade therethrough, as and for a purpose as will hereinafter appear.

F and G are similar spring-fingers each, respectively, in a series more or less in number and particularly shown as consisting of four in each series. The spring-fingers F are located in one section A and the spring-fingers G in the other section B, and in both instances they are severally attached at one and the corresponding end portion in any suitable manner to and about the central portion of their respective sections, and thus attached otherwise to project therefrom in vertical lines or directions, with their extreme outer ends *f* and *g* inside of the edges *a* and *b*, respectively, and free, as also the portion of each between said free ends and their fixed end portions, as above stated, and all such as to permit an orange, a pomelo, or other such like fruit to be placed or entered between them, and so placed held against accidental displacement or dislodgment and with sufficient firmness for the purposes desired, as will hereinafter appear, and to be similarly adapted and to act for oranges, pomelos, or other such like fruit of varying sizes.

Each section A B is provided with similar legs H J, respectively, for the support of the sections closed by the legs J of the lower section A and for the support of the sections opened by the respective legs of each. Other forms of supports may be used in place of legs, as, for illustration, a continuous flange or rim K, as shown on a reduced scale in Fig. 3.

In using the dish described its sections, if closed, are first opened from each other, and then the orange or other such like article of fruit (shown by a circular dotted line L) is placed within either one or the other of the series of spring-fingers or holders, and the sections are then closed together, and thus the orange, &c., inserted as stated, is entered within the other of the series of spring-fingers or holders, and between the two series of spring-fingers or holders it is then substantially one half in one dish-section and the other half in the other dish-section, and in both instances plainly sufficiently secure against accidental displacement or dislodgment for being cut or divided into two parts, or, in other words, halved, by then passing a suitable knife across the dish through the open way *d* between the contiguous edges of the sections, when opening the upper section from the lower each half of the orange, &c., is properly presented for being eaten with a teaspoon or scoop or other suitable instrument, and all without requiring or calling for contact of the fingers of the hand with the fruit.

M is a well at the central portion of each dish-section for receiving drippings when the fruit is being eaten.

The sections A and B may be disjointed by removing the pintle of their hinge connection, and so each used separately from the other.

Having thus described my invention, what I claim, and desire to secure by Letters Patent, is—

1. A dish composed of two hollow sections or parts, together suitable to inclose or incase an orange, &c., and adapted to be located the one over the other and to be opened from and closed toward each other, and means on each section or part to support, when the sections are opened, each section independently of the other, and when the sections are closed to support both of them, in combination with devices which are within and carried by each of said sections, and those of each section suitable to grasp and hold an orange, &c., at its sides, and with said sections closed, to expose it, for being divided into parts by then passing a suitable cutting instrument across and through it and between the contiguous edges of the closed sections.

2. A dish composed of two hollow sections or parts, together suitable to inclose or incase an orange, &c., and adapted to be located the one over the other and to be opened from and closed toward each other, and means on each section or part to support, when the sections are opened, each section independently of the other, and when the sections are closed to support both of them, in combination with a series of vertical spring-fingers, which are confined at one and free at their other ends and are within and carried by each of said sections, and those of each section suitable to grasp and hold an orange, &c., at its sides, and with said sections closed, to expose it, for being divided in two parts by then passing a suitable cutting instrument across and through it and between the contiguous edges of the closed sections.

3. A dish composed of two hollow sections or parts, together suitable to inclose or incase an orange, &c., and adapted to be located the one over the other and to be opened from and closed toward each other, means on each section or part to support, when the sections are opened, each section independently of the other, and when the sections are closed to support both of them, and a horizontal ledge or rest at one and the same side of each dish-section, and in position with the dish-sections closed for the one to abut and rest upon the other and thereby to leave an open way or space between the contiguous edges of the sections when closed, in combination with devices which are within and carried by each of said sections, and those of each section suitable to grasp and hold an orange, &c., at its sides, and with said sections closed, to expose it, for being divided into parts by then passing a suitable cutting instrument across and through it and along said open way or space between the contiguous edges of the closed sections.

In witness whereof I have hereunto set my hand in the presence of two subscribing witnesses

HERBERT F. PROVANDIE.

Witnesses:
 ALBERT W. BROWN,
 SAMUEL GRIFFIN.